(12) United States Patent
Straub, Jr.

(10) Patent No.: US 8,302,455 B2
(45) Date of Patent: Nov. 6, 2012

(54) DETERMINING DELAY TIMES FOR ULTRASONIC FLOW METERS

(75) Inventor: Henry C. Straub, Jr., Sugar Land, TX (US)

(73) Assignee: Daniel Measurement and Control, Inc., Houston, TX (US)

( * ) Notice: Subject to any disclaimer, the term of this patent is extended or adjusted under 35 U.S.C. 154(b) by 80 days.

(21) Appl. No.: 13/025,223

(22) Filed: Feb. 11, 2011

(65) Prior Publication Data

US 2012/0204620 A1    Aug. 16, 2012

(51) Int. Cl.
*G01P 21/00*       (2006.01)
(52) U.S. Cl. ........................................ 73/1.34
(58) Field of Classification Search ........................ None
See application file for complete search history.

(56) References Cited

U.S. PATENT DOCUMENTS

| | | |
|---|---|---|
| 7,624,651 B2 | 12/2009 | Fernald et al. |
| 7,823,463 B1 | 11/2010 | Feller |
| 2006/0156828 A1 | 7/2006 | Konzelmann et al. |

OTHER PUBLICATIONS

American Gas Association, "AGA Report No. 9, Measurement of Gas by Multipath Ultrasonic Meters," Second Edition, Apr. 2007, Catalog No. XQ0701, pp. vi-x and 17-21, Washington, DC.
American Gas Association, "AGA Report No. 10, Speed of Sound in Natural Gas and Other Related Hydrocarbon Gases," 2003, Catalog No. XQ0310, pp. v11-v13, Washington, DC.
International Application No. PCT/US2012/021825 Search Report and Written Opinion dated Aug. 7, 2012.

*Primary Examiner* — Robert R Raevis
(74) *Attorney, Agent, or Firm* — Conley Rose, P.C.

(57) ABSTRACT

A system and method for calibrating an ultrasonic flow meter. In one embodiment, a method includes disposing a fluid circulating device within a flow meter. Fluid is circulated in the flow meter by operation of the fluid circulating device. An acoustic signal transit time within the flow meter is measured during the circulating. Based on the measuring, a portion of the acoustic signal transit time caused by latency induced by components of the flow meter is determined.

23 Claims, 5 Drawing Sheets

DETERMINING DELAY TIMES FOR ULTRASONIC FLOW METERS

BACKGROUND

Natural gas is transported from place-to-place via pipelines. It is desirable to know with accuracy the amount of gas flowing in the pipeline, and particular accuracy is demanded when the fluid is changing hands, or "custody transfer." Even where custody transfer is not taking place, however, measurement accuracy is desirable, and in these situations flow meters may be used.

Ultrasonic flow meters are one type of flow meter that may be used to measure the amount of fluid flowing in a pipeline. Ultrasonic flow meters have sufficient accuracy to be used in custody transfer. In an ultrasonic flow meter, acoustic signals are sent back and forth across the fluid stream to be measured. Based on parameters of received acoustic signals, the fluid flow velocity in the flow meter is determined. The volume of fluid flowing the meter can be determined from determined flow velocities and the known cross-sectional area of the flow meter.

The transit time of acoustic signals in an ultrasonic flow meter includes time required for signals to travel through fluid flowing in the meter, time that the acoustic signals spend within the transducers that produce and detect the signal, and time required to process the signals. In order to accurately determine fluid flow velocity, and thus to determine the value of the fluid, each of the aforementioned components of the signal transit time must be accurately determined.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device or component couples to a second device or component, that connection may be through a direct engagement between the two or through an indirect connection via other intermediate devices, components, and/or connections.

DETAILED DESCRIPTION

The following discussion is directed to various embodiments of the invention. Although one or more of these embodiments may be preferred, the embodiments disclosed should not be interpreted, or otherwise used, to limit the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1A:
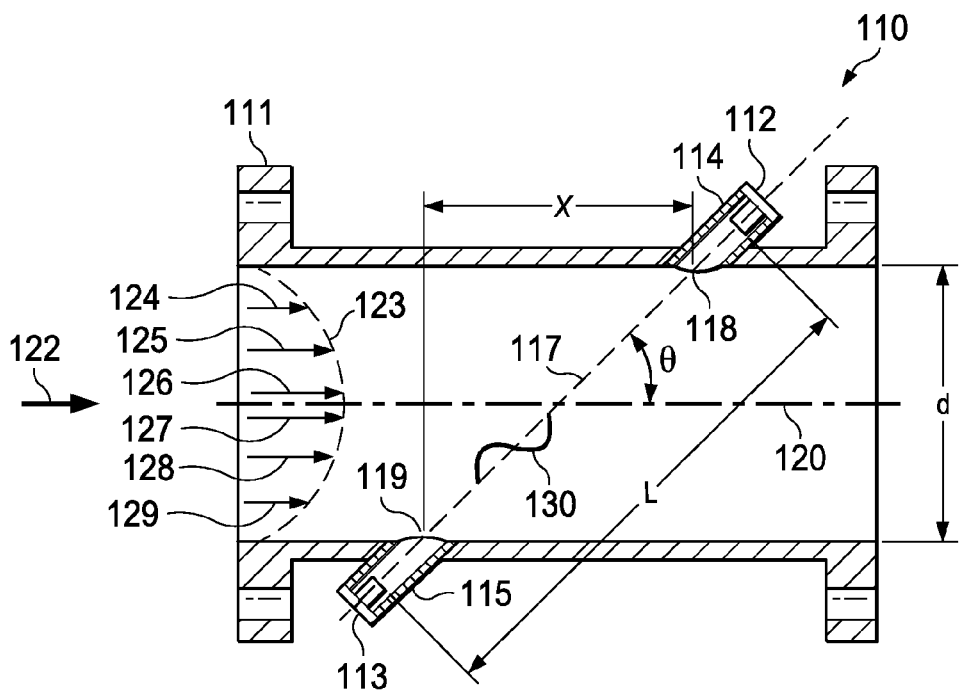
FIG. 1A shows an elevational cross-sectional view of an ultrasonic flow meter in accordance with various embodiments.
Figure 1B:
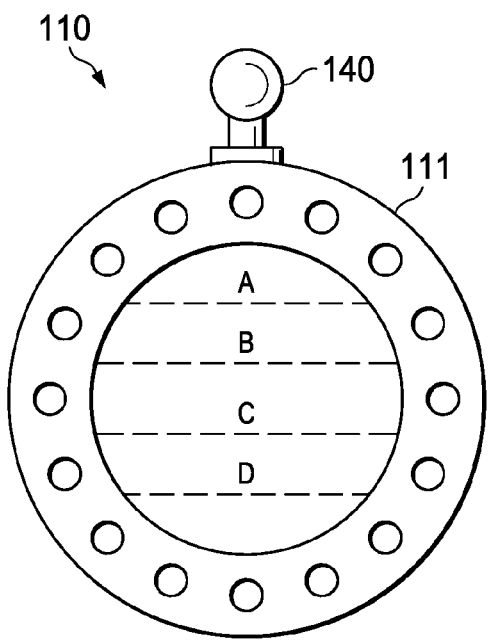
FIG. 1B shows an elevational end view or an ultrasonic flow meter including a plurality of chordal paths in accordance with various embodiments.

FIGS. 1A and 1B show an embodiment of an ultrasonic flow meter 110 illustrating basic components and relationships. Meter body 111, suitable for placement between sections of a pipeline, has a predetermined size and defines a central passage through which a measured fluid (e.g., gas and/or liquid that is to be measured) flows. An illustrative pair of transducers 112 and 113, and their respective housings 114 and 115, are disposed along the length of the meter body 111. Transducers 112 and 113 are acoustic transceivers, and more particularly ultrasonic transceivers, meaning that they both generate and receive acoustic energy having frequencies of above 20 kilohertz. The acoustic energy may be generated and received by a piezoelectric element in each transducer. To generate an acoustic signal, the piezoelectric element is stimulated electrically by way of a sinusoidal signal, and it responds by vibrating. The vibration of the piezoelectric element generates the acoustic signal that travels through the measured fluid to the corresponding transducer of the transducer pair. Similarly, upon being struck by acoustic energy (i.e., the acoustic signal and other noise signals), the receiving piezoelectric element vibrates and generates a sinusoidal electrical signal that is detected, digitized, and analyzed by electronics associated with the meter.

A path 117, sometimes referred to as a "chord," exists between illustrative transducers 112 and 113 at an angle $\theta$ to a centerline 120. The length of "chord" 117 is the distance between the face of transducer 112 and the face of transducer 113. Points 118 and 119 define the locations where acoustic signals generated by transducers 112 and 113 enter and leave fluid flowing through the meter body 111 (i.e., the entrance to the meter body bore). The position of transducers 112 and 113 may be defined by the angle $\theta$, by a first length L measured between transducers 112 and 113, a second length X corresponding to the axial distance between points 118 and 119, and a third length d corresponding to the pipe inside diameter. In most cases distances d, X, and L are precisely determined during meter fabrication. Further, transducers such as 112 and 113 are usually placed a specific distance from points 118 and 119, respectively, regardless of meter size (i.e., meter body size). A measured fluid, such as natural gas, flows in a direction 122 with a velocity profile 123. Velocity vectors 124-129 illustrate that the fluid velocity through meter body 111 increases toward the centerline 120.

Initially, the downstream transducer 112 generates an acoustic signal that propagates across the fluid in the meter body 111, and is then incident upon and detected by upstream transducer 113. A short time later (e.g., within a few milliseconds), the upstream transducer 113 generates a return acoustic signal that propagates back across the fluid in the meter body 111, and is then incident upon and detected by the downstream transducer 112. Thus, the transducers 112 and 113 play "pitch and catch" with signals 130 along chordal path 117. During operation, this sequence may occur thousands of times per minute.

The transit time of the acoustic signal 130 (i.e., the time required for sound energy to travel) between transducers 112 and 113 depends in part upon whether the acoustic signal 130 is traveling upstream or downstream with respect to the fluid flow. The transit time for an acoustic signal traveling downstream (i.e., in the same direction as the fluid flow) is less than its transit time when traveling upstream (i.e., against the fluid flow). The upstream and downstream transit times for a chord can be used to calculate the mean fluid flow velocity, and the average speed of sound for the chord in the measured fluid.

Ultrasonic flow meters can have one or more acoustic signal paths. FIG. 1B illustrates an elevation view of one end of ultrasonic flow meter 110. As shown in FIG. 1B, ultrasonic flow meter 110 actually comprises four chordal paths A, B, C and D at varying levels within the meter body 111. Each chordal path A-D corresponds to a transducer pair behaving alternately as a transmitter and receiver. Also shown is meter control electronics package 140, which includes control electronics that acquire and process the data from the four chordal paths A-D. Hidden from view in FIG. 1B are the four pairs of transducers that correspond to chordal paths A-D.

Figure 1C:
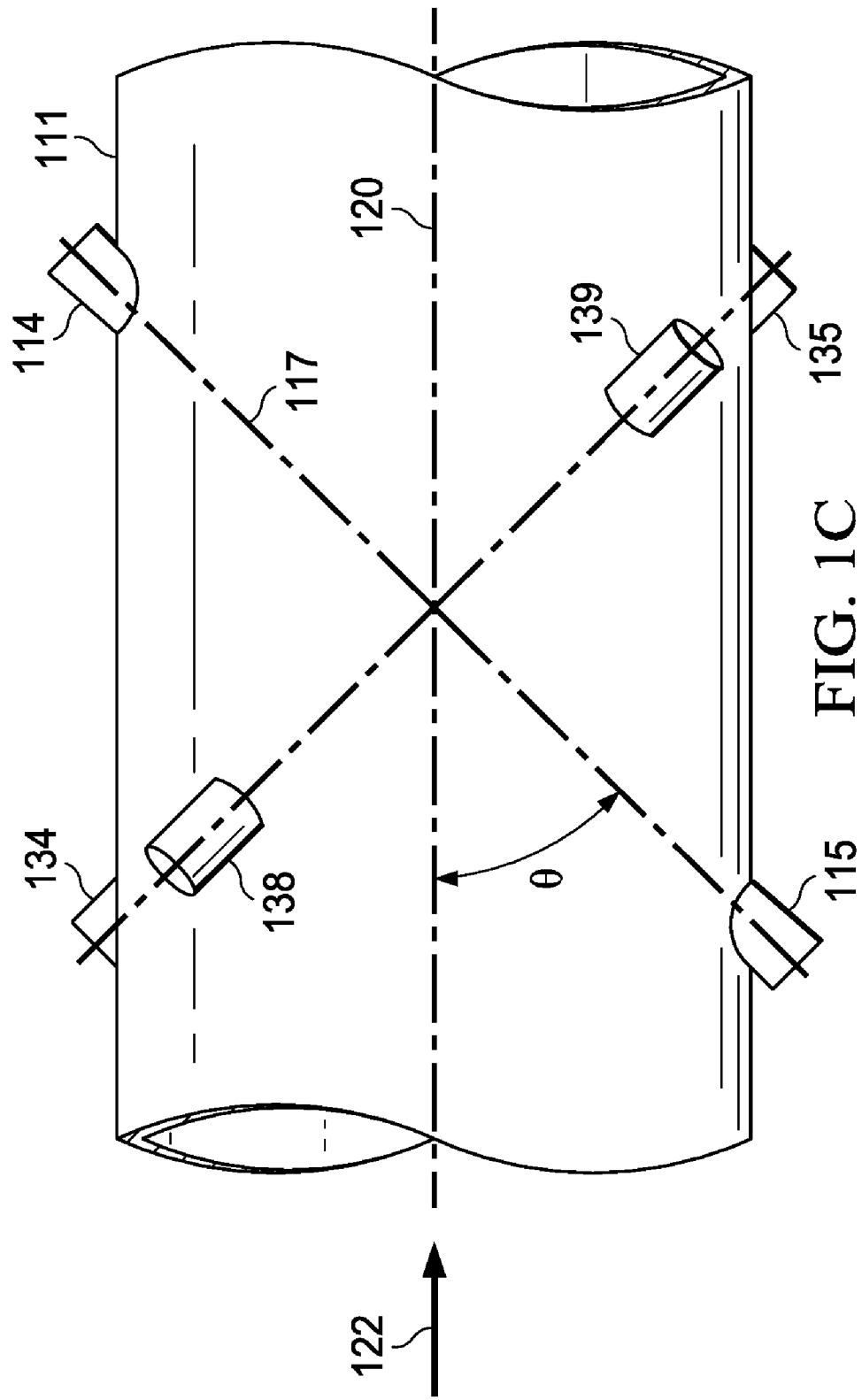
FIG. 1C shows, in schematic form, an top view of an ultrasonic flow meter in accordance with various embodiments.

The arrangement of the four pairs of transducers may be more easily understood by reference to FIG. 1C. Four pairs of transducer ports are mounted on meter body 111. Each pair of transducer ports corresponds to a single chordal path of FIG. 1B. A first pair of transducer ports 114 and 115 comprises transducers 112 and 113 (FIG. 1A). The transducers are mounted at a non-perpendicular angle θ to centerline 120 of the meter body 111. Another pair of transducer ports 134 and 135 (only partially in view) and associated transducers is mounted so that its chordal path loosely forms the shape of an "X" with respect to the chordal path of transducer ports 114 and 115. Similarly, transducer ports 138 and 139 are placed parallel to transducer ports 134 and 135 but at a different "level" (i.e., a different radial position in the pipe or meter body). Not explicitly shown in FIG. 1C is a fourth pair of transducers and transducer ports. Taking FIGS. 1B and 1C together, the pairs of transducers are arranged such that the upper two pairs of transducers corresponding to chords A and B form an the shape of an "X", and the lower two pairs of transducers corresponding to chords C and D also form the shape of an "X". The flow velocity of the fluid may be determined at each chord A-D to obtain chordal flow velocities, and the chordal flow velocities combined to determine a mean flow velocity for the meter 110. The volumetric flow rate through the meter 110 is a product of the mean flow velocity for the meter 110 and the cross-sectional area of the meter 110.

Typically, control electronics (e.g., control electronics package 140) cause the transducers (e.g., 112, 113) to fire, receive the output of the transducers, compute the mean flow velocity for each chord, compute the mean flow velocity for the meter, and compute the volumetric flow rate through the meter. The volumetric flow rate and possibly other measured and computed values, such as flow velocity and speed of sound, are then output to additional devices, such as a flow computer, that are external to the meter 110.

As mentioned above, each ultrasonic transducer 112, 113 typically includes a piezoelectric crystal. The piezoelectric crystal is the active element that emits and receives sound energy. The piezoelectric crystal comprises a piezoelectric material such as lead zirconate titanate (PZT) and electrodes on the surface of the piezoelectric material. The electrodes are typically a thin layer of a conductive material such as silver or nickel. A voltage difference applied between the electrodes induces an electric field within the piezoelectric material that causes it to change shape and emit sound energy. Sound energy impinging on the piezoelectric material causes the piezoelectric material to change shape and develop a voltage between the electrodes. The piezoelectric crystal is typically encapsulated within an epoxy that holds the piezoelectric crystal in place, protects the piezoelectric crystal, and provides a matching layer to improve the coupling of sound energy between the piezoelectric crystal and fluid within the meter 110.

For a given chord, the chordal flow velocity v is given by $$v = \frac{L^2}{2X} \cdot \frac{T_{up} - T_{dn}}{T_{up} T_{dn}} \quad (1)$$

and the chordal speed of sound c is given by $$c = \frac{L}{2} \cdot \frac{T_{up} + T_{dn}}{T_{up} T_{dn}} \quad (2)$$

where L is the path length (i.e., face-to-face separation between upstream and downstream transducers), X is the component of L within the meter bore in the direction of the flow, and $T_{up}$ and $T_{dn}$ are the upstream and downstream transit times of sound energy through the fluid.

As shown in Equations (1) and (2), the chordal flow velocity and speed of sound depend on the transit time of the signal 130 through the fluid. The transit times measured by the meter electronics 140, however, include the transit time through the fluid plus some additional time that is termed a delay time. This delay time should be subtracted from the measured transit times to obtain accurate values for the chordal flow velocity and speed of sound.

The delay time has two primary components: 1) the time the acoustic 130 spends within the transducers, and 2) the time corresponding to processing of the signal 130. Since the piezoelectric crystal of the transducer 112 is not in direct contact with the fluid, the time it takes sound energy to travel from the transmitting piezoelectric crystal to the fluid and the time it takes sound energy to travel from the fluid to the receiving piezoelectric crystal contribute to the delay time.

For each chord, there can be two different delay times associated with the transducers 112, 113 of that chord. The upstream delay time is the delay time when acoustic signal 130 travels from the downstream to upstream transducer (e.g. transducer 112 to transducer 113) and the downstream delay time is the delay time when acoustic signal 130 travels from the upstream to downstream transducer (e.g. transducer 113 to transducer 112). Ideally, the upstream and downstream delay times would be identical, however, minor differences in the components and construction of the upstream and downstream transducers 112, 113 coupled with different electrical impedances in the transmitting and receiving portions of the meter electronics 140 cause the upstream and downstream delay times to be slightly different.

To clarify the small difference in upstream and downstream delay times and its effect on the chordal flow velocity, the upstream and downstream delay times can be recast as an average delay time, which is the average of the upstream and downstream delay times, and a delta delay time, which is the difference between the upstream and downstream delay times. For the transducers 112, 113 used in some ultrasonic meters, the average delay times are typically approximately 20 μs while the absolute values of the delta delay time are typically less than 0.05 μs demonstrating that the difference in upstream and downstream delay times is typically at least 400 times less than the upstream or downstream delay time. Equations (1) and (2) can be rewritten to include the average delay time $\tau_{avg}$ and the delta delay time $\tau_{delta}$ yielding:

$$v = \frac{L^2}{2X} \cdot \frac{T_{up}^m - T_{dn}^m - \tau_{delta}}{(T_{up}^m - \tau_{avg})(T_{dn}^m - \tau_{avg})} \quad (3)$$

and $$c = \frac{L}{2} \cdot \frac{T_{up}^m + T_{dn}^m - 2\tau_{avg}}{(T_{up}^m - \tau_{avg})(T_{dn}^m - \tau_{avg})} \quad (4)$$

where $T_{up}^m$ and $T_{dn}^m$ are the measured upstream and downstream transit times.

Embodiments of the present disclosure determine the average and delta delay times of each transducer pair (e.g. transducers 112, 113). The delay times of a transducer pair are preferably determined with the transducers installed in the ultrasonic flow meter in which they are to be used. The procedure for determining delay times of a transducer pair is typically referred to as "dry calibration."

Dry calibration of a gas ultrasonic flow meter 110 involves sealing the ends of (e.g., installing blind flanges on) the meter 110 so that the meter 110 can be pressurized with a fluid of known composition, such as pure nitrogen. For calibration purposes, pressure and temperature transducers are also installed on the meter 110 so that pressure and temperature of the fluid can be determined. After pressurizing the meter 110 with fluid, the system is allowed to stabilize to insure that there is no flow within the meter 110 and that the meter 110 and fluid are in thermal equilibrium. After stabilization, the upstream and downstream transit times are measured simultaneously with the gas temperature and pressure. From the known fluid temperature, pressure, and composition, the speed of sound through the fluid can be computed from predetermined theoretical or experimental values. An example of one method to compute speeds of sound can be found in AGA Report No. 10, "Speed of Sound in Natural Gas and Other Related Hydrocarbons."

From the measured transit times $T_{up}^m$ and $T_{dn}^m$, the upstream and downstream delay times $\tau_{up}$ and $\tau_{dn}$ can be derived as $$\tau_{up} = T_{up}^m - \frac{L}{c_{calc}} \quad (5)$$

and $$\tau_{dn} = T_{dn}^m - \frac{L}{c_{calc}} \quad (6)$$

where $c_{calc}$ is the calculated speed of sound. The average and delta delay times are then given by $$\tau_{avg} = \frac{\tau_{up} + \tau_{dn}}{2} = \frac{T_{up}^m + T_{dn}^m}{2} - \frac{L}{c_{calc}} \quad (7)$$

and $$\tau_{delta} = \tau_{up} - \tau_{dn} = T_{up}^m - T_{dn}^m. \quad (8)$$

An error can be introduced in the average delay times determined during dry calibration for the multipath ultrasonic flow meter 110 due to temperature gradients in the fluid. In the multipath meter 110, there are multiple chords that can be at different elevations within the meter 110. For example, the meter 110, as shown in FIG. 1B may have four different chords, each at different elevation within the meter 110. During a dry calibration with no flow within the meter 110, a temperature gradient tends to occur within the fluid in which the fluid at the top of the meter 110 is hotter than the fluid at the bottom of the meter 110. The magnitude of the temperature gradient between the top and bottom of the meter 110 tends to increase with increasing meter size and can exceed 0.5° F. A temperature gradient will cause each chord of the meter 110 to have a different temperature and, therefore, a different speed of sound than the speed of sound calculated for the fluid using a temperature measured at a single elevation inside the meter 110 during dry calibration. This error in the calculated speed of sound will result in an error in the average delay time when the calculated speed of sound is used in Equation 7. The error $\Delta\tau_{avg}$ in average delay time is given by $$\Delta\tau_{avg} = \frac{L}{c_{calc}^2} \Delta c_{calc} \quad (9)$$

where $\Delta c_{calc}$ is the error in the calculated speed of sound. Dry calibration may be performed with nitrogen at a temperature of approximately 75° F. and a pressure of approximately 200 psig. For these conditions the speed of sound is approximately 1160 ft/s and the change in speed of sound $\Delta c_{calc}$, for a small change in temperature $\Delta T$ is $$\Delta c_{calc} = \left(1.1 \frac{\text{ft}}{\text{s}^\circ \text{F}}\right) \Delta T. \quad (10)$$

Substituting Equation 10 into Equation 9 yields $$\Delta\tau_{avg} = \left(1.1 \frac{\text{ft}}{\text{s}^\circ \text{F}}\right) \frac{L}{c_{calc}^2} \Delta T. \quad (11)$$

The error introduced in the average delay time by a temperature gradient during dry calibration will introduce errors in both the chordal flow velocities and speeds of sound (see Equations 3 and 4). The error v in chordal flow velocity due to the error in the average delay time is given by $$\frac{\Delta v}{v} = \frac{2c}{L} \Delta\tau_{avg}, \quad (12)$$

and the error Δc in the chordal speed of sound due to the error in the average delay time is given by $$\frac{\Delta c}{c} = \frac{c}{L}\Delta\tau_{avg}. \quad (13)$$

In addition to causing errors in the chordal flow velocity and speed of sound, errors in the average delay times also cause an undesirable spread in the chordal speeds of sound. When an ultrasonic flow meter 110 is used to meter fluid in a pipeline, the turbulence induced by fluid flow causes the fluid to be well mixed and insures that there are no thermal gradients in the fluid. The error induced in the average delay time by a thermal gradient present during dry calibration will cause an apparent spread in chordal speeds of sound measured for a flowing fluid that has no thermal gradients. The apparent spread in chordal speeds of sound can be found by combining Equations 11 and 13 to give $$\Delta c = \left(1.1\frac{\text{ft}}{s^\circ \text{F}}\right)\frac{c^2}{c_{calc}^2}\Delta T. \quad (14)$$

For example, if the pipeline fluid being metered is methane with a speed of sound of approximately 1400 ft/s, then the spread in chordal speeds of sound measured in the pipeline due to a 0.5° F. temperature gradient present during dry calibration is approximately 0.8 ft/s.

When a gas ultrasonic flow meter is used for a custody transfer measurement, the contract between the buyer and seller often incorporates the standard AGA Report No. 9, "Measurement of Gas by Multipath Ultrasonic Meters" as part of the contract. Section 5.1 of AGA Report No. 9 requires that all ultrasonic flow meters shall meet the requirement that the maximum spread in chordal speeds of sounds is 1.5 ft/s. A 0.5° F. temperature gradient during dry calibration can result in a spread in chordal speeds of sound that consumes over half of the spread in chordal speeds of sound allowed by AGA Report No. 9. Any additional errors such as minor changes in the transducer 112, 113 delay times due to temperature changes can cause the maximum allowable spread to be much more easily exceeded.

Embodiments of the present disclosure eliminate temperature gradients during dry calibration of the ultrasonic meter 110 by introducing a small amount of circulation in the fluid within the meter 110. The circulation may be induced by a fluid circulation or agitation device, such as a small fan, that is placed within the meter body 111. Embodiments separate the dry calibration procedure into two parts to make use of fluid circulation during calibration. In one part, the delta delay times are determined without circulation. In the second part, the average delay times are determined with fluid circulation.

Circulating the fluid within the meter 110 while determining the average delay times insures that the temperature of the fluid is consistent throughout and that no temperature gradients exist. This improves the accuracy of the determination of the average delay time for each chord and therefore improves the accuracy of the computed chordal flow velocities and speeds of sound when the meter 110 is used to measure flowing fluid in a pipeline. Improving the accuracy of the measured chordal flow velocity ultimately results in an increased accuracy in the measured flow rate which is particularly important if the meter 110 is being used for a custody transfer measurement. Improving the accuracy of the measured chordal speeds of sound tends to reduce the spread in measured chordal speeds of sound which gives the operator of the meter 110 increased confidence that the meter 110 is operating correctly.

Figure 2:
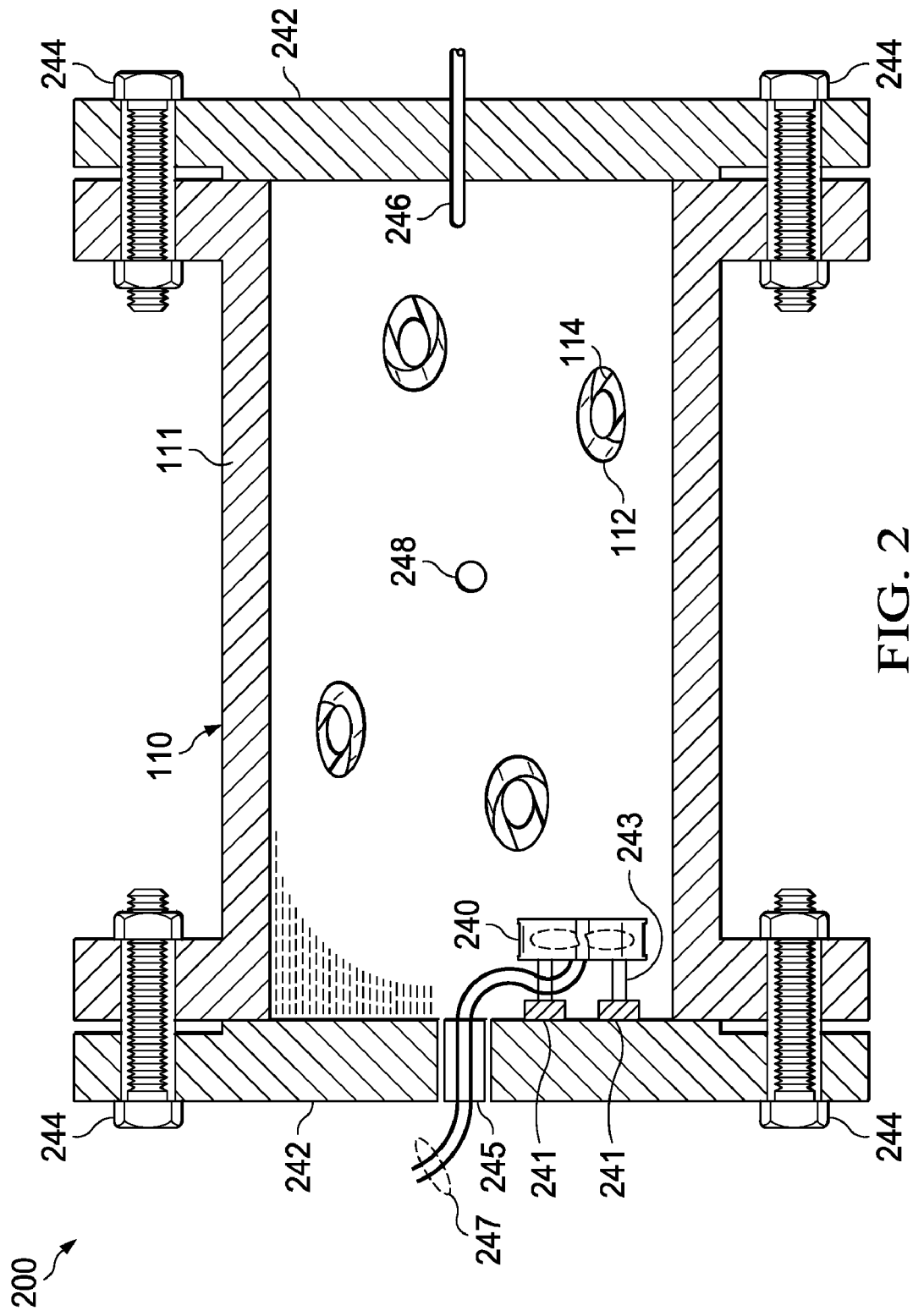
FIG. 2 shows, in schematic form, cross-sectional view of an ultrasonic flow meter assembly configured for dry calibration in accordance with various embodiments.

FIG. 2 shows an elevational cross-sectional view of an ultrasonic flow meter assembly 200 configured for dry calibration in accordance with various embodiments. The meter assembly 200 includes a flow meter 110, blind flanges 242, a temperature sensor 246, and a fan 240. A blind flange 242 is fastened to each end of the meter body 111 of the meter 110 using fastening devices 244 (e.g., bolts and nuts, clamps, etc.). The temperature sensor 246 is introduced into the meter 110 through a port in either the meter body 111 or one of the blind flanges 242 to measure fluid temperature. The temperature sensor 246 is positioned so that it does not obstruct any of the paths of sound energy traveling between ultrasonic transducers (e.g. 112 and 113 FIG. 1A). A fluid line and pressure gauge (not shown) are attached to a port 248 in either the meter body 111 or one of the blind flanges 242. The fluid line allows fluid to be added and removed from the meter body 111 while the pressure gauge is used to monitor fluid pressure within the meter 110.

The fan 240, or other fluid circulation device, is disposed within the meter body 111. In some embodiments, the fan 240 is disposed within the meter body 111 by mounting the fan 240 to a blind flange 242 with magnets 241. The magnets 241 ensure that the fan 240 stays in place while facilitating installation and removal. Separators (e.g., standoffs) 243 positioned between the fan 240 and magnet 241 position the fan 240 away from the surface of the flange 242 and allow fluid to flow through the fan 240. An electrical feed through 245 in a port in either the meter body 111 or one of the blind flanges 242 allows electricity to be supplied to the fan 240 via wiring 247.

The fan 240 is positioned within the meter body 111 at a location that provides clearance for fluid to flow through the fan 240 while the fan 240 and associated components (wiring 247, standoffs 243, etc.) do not interfere with any of the paths traversed by sound energy traveling between the ultrasonic transducers. In some embodiments, the fan 240 is fastened to the blind flange 242 using bolts or adhesives. In other embodiments, the fan 240 is attached to the meter body 111 by magnets 241, adhesives, or simply held in place by the force of gravity.

Various types of fans, where a fan is simply a device to induce fluid circulation, are suitable for use with embodiments disclosed herein. The fan 240 may be configured to operate using direct current (DC), rather than alternating current, to reduce the risk of electric shock to an operator conducting the dry calibration. The fan 240 may be a DC brushless fan of the type commonly used in computer and instrument cases. The diameter of the fan 240 is preferably between 10% and 35% of the internal diameter of the meter body 111.

Little or no fluid flow should be present during the determination of delta delay times. Therefore, embodiments employ a dry calibration procedure that separately determines the average and delta delay times. After the fan 240, temperature probe 246, fluid line, pressure gauge, and blind flanges 242 are installed, fluid is added to the meter body 111 for use in the calibration. One suitable calibration fluid is nitrogen at 200 psig but other calibration fluids and other pressures may also be used. To eliminate impurities carried by the air that is initially present in the meter body 111, the calibration fluid can be purged and added to meter body 111 several times. Alternatively, air can be removed from the meter body 111 with a vacuum pump before adding the calibration fluid to the meter body 111. After the meter 110 is pressurized with calibration fluid, the connection to the fluid source is closed and the fluid within the meter body 111 is allowed to stabilize for a period of time (e.g., at least one hour) to insure that all residual flow caused by adding the calibration fluid to the meter 110 has decayed away and that the fluid in is thermal equilibrium within the meter 110. The transducers are activated, transit times are measured for each chord, and delta delay times are determined using equation (8).

Following delta delay determination, the fan 240 is turned on and the calibration fluid is allowed to stabilize for a period of time (e.g., at least 10 minutes). Sound energy transit times and fluid temperature and pressure are again measured. The speed of sound is determined using suitable predetermined values such as found in AGA Report No. 10, "Speed of Sound in Natural Gas and Other Related Hydrocarbons," and the average delay time is determined using Equation 7. The speed of fan 240 is such that the absolute value of each chordal flow velocity is preferably between 0.5 and 2 ft/s. A minimum speed is needed to insure that the calibration fluid is well mixed and has no thermal gradients. If the fluid speed is too high, suitable modifications to Equation 7 are applied to account for a high flow velocity.

In an alternative embodiment, delta delay times are determined after average delay times are determined. In such an embodiment, the fan 240 is turned on after filling the meter with calibration fluid and the fluid is allowed to stabilize for a period of time (e.g., at least an hour) before determining average delay times. The fan 240 is then be turned off and the calibration fluid is allowed to stabilize for a period of time (e.g., at least an hour) before determining delta delay times.

Figure 3:
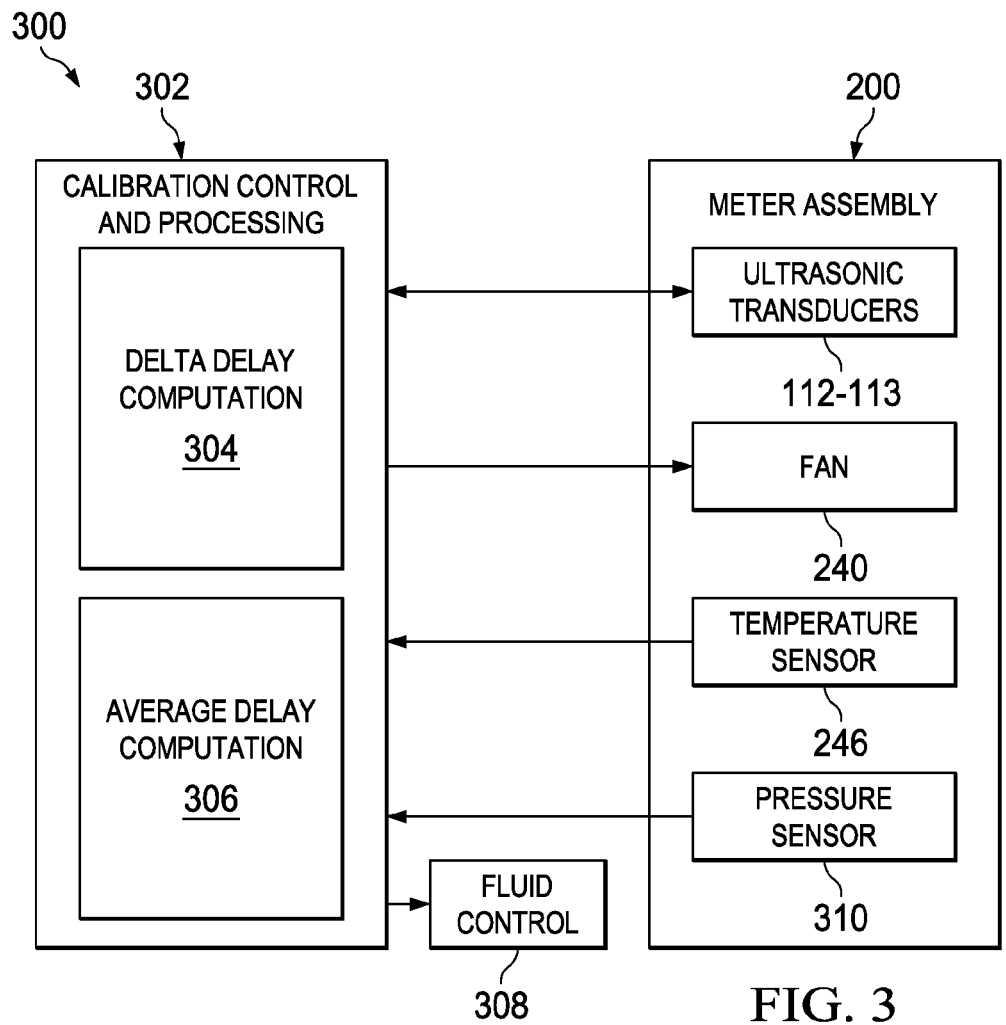
FIG. 3 shows a block diagram of a system for performing dry calibration of an ultrasonic meter in accordance with various embodiments.

FIG. 3 shows a block diagram of a system 300 for performing dry calibration of an ultrasonic meter in accordance with various embodiments. The system 300 includes the flow meter assembly 200 and calibration control and processing system 302. The calibration control and processing system 302 controls the operation of the various components (e.g., transducers 112, 113) of the meter assembly 200, and causes the meter assembly 200 to perform operations that generate calibration data. The calibration control and processing system 302 processes the calibration data generated by the meter assembly 200 to produce chordal delay values. In some embodiments, the meter electronics 140 may include at least some portions of the calibration control and processing system 302.

Some embodiments of the calibration control and processing system 302 generate signals that control one or more of the ultrasonic transducers (e.g., 112, 113) and the fan 240 of the meter assembly 200. For example, signals generated by the calibration control and processing system 302 may control the timing of transducer 112 sound signal generation, and may control activation/deactivation of the fan 240. Additionally, the calibration control and processing system 302 may generate signals to manage a fluid control system 308 (e.g., a valve or the like) that introduces fluid into the meter 110 from a fluid source. Alternatively, the calibration and processing system 302 may prompt a user to manually introduce fluid into meter 110 from a fluid source.

The calibration control and processing system 302 may also receive signals produced by the meter assembly 200 during calibration. For example, information indicative of fluid pressure and temperature may be received from the pressure sensor 310 and the temperature sensor 246, and information indicative of sound signal transit time in the meter 110 may be received from the ultrasonic transducers 112. The received information may be processed by the delta delay computation logic 304 and the average delay computation logic 306 to respectively generate delta and average delays as explained herein.

Some embodiments of the calibration control and processing system 302 may include a computer to perform control and data processing functions. A computer suitable for use in the calibration control and processing system 302 may be a desktop computer, a notebook computer, a handheld computer, a tablet computer, or any other computing device capable of the performing the control and processing functions described herein. The delta delay computation logic 304 and the average delay computation logic 306 can be implemented as software instructions stored in a computer readable storage medium. When executed by a computer the instructions cause the computer to perform the delta delay and average delay computations disclosed herein. Other software programming included in the calibration control and processing system 302 may cause the computer to perform other of the various control functions and/or processing functions described herein. A computer readable storage medium suitable for storage of software instructions comprises volatile storage such as random access memory, non-volatile storage (e.g., a hard drive, an optical storage device (e.g., CD or DVD), FLASH storage, or combinations thereof.

Figure 4:
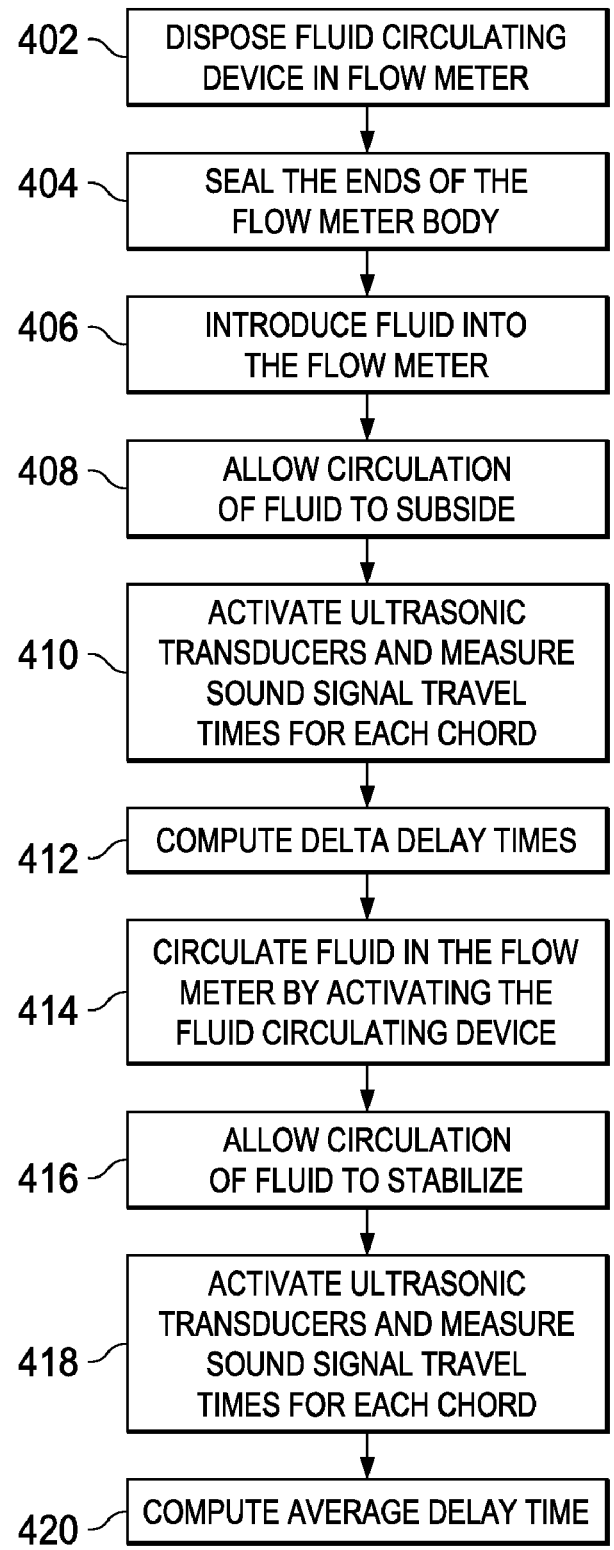
FIG. 4 shows a flow diagram for a method for dry calibration of an ultrasonic flow meter in accordance with various embodiments.

FIG. 4 shows a flow diagram for a method for dry calibration of an ultrasonic flow meter in accordance with various embodiments. Though depicted sequentially as a matter of convenience, at least some of the actions shown can be performed in a different order and/or performed in parallel. Additionally, some embodiments may perform only some of the actions shown. In some embodiments, at least some of the operations of FIG. 4, as well as other operations described herein, can be implemented as instructions stored in a computer readable medium and executed by a processor (e.g., a processor of a computer in the calibration control and processing system 302).

In block 402, a fluid circulating device, such as the fan 240, is disposed in the interior of a flow meter 110 to facilitate dry calibration. The fluid circulating device is positioned to avoid interfering with acoustic signals traversing the interior of the meter 110, and to allow fluid to flow through the fluid circulating device. More specifically, the fluid circulating device is disposed in a position outside of each chordal path. A temperature sensor is also positioned in the interior of the meter body 111.

In block 404, the ends of the flow meter body 111 are sealed. In some embodiments, blind flanges 242 are affixed to the ends of the meter body 111 to effectuate sealing.

In block 406, calibration fluid is introduced into the meter body 111. The calibration fluid may be a gas, such as nitrogen, and the fluid may provided to the meter body 111 at a predetermined pressure (e.g., 200 psig). Additionally, impurities initially present in the meter body may be eliminated by purging and filling the meter body with the calibration fluid several times.

In block 408, circulation induced by introduction of the calibration fluid into the meter body 111 is allowed to subside. In some embodiments, circulation is deemed to have sufficiently subsided based on expiration of a predetermined time interval (e.g., one hour).

In block 410, the calibration and control system 302 activates the ultrasonic transducers (e.g., 112, 113) of the meter 110 and, for each chord, measures upstream and downstream sound travel times across the meter 110.

In block 412, the calibration and control system 302 computes upstream and downstream delay times and a delta delay time value for each chord based on the measured travel times.

In block 414, the fluid circulation is induced in the meter body 111 by activating the fluid circulating device 240. By circulating the calibration fluid a uniform temperature within the meter body 111 is achieved. Fluid circulation continues in block 416 to allow the calibration fluid to stabilize. In some embodiments, the calibration fluid is deemed stabilized when circulation has been active for a predetermined period of time (e.g., 10 minutes).

In block 418, after the circulating fluid is stabilized, the calibration and control system 302 activates the ultrasonic transducers (e.g., 112, 113) of the meter 110 and, for each chord, measures upstream and downstream sound travel times across the meter 110. The temperature and pressure of the fluid in the meter 110 are also measured.

In block 420, the calibration and control system 302 computes the speed of sound through the calibration fluid in the meter 110 based on the measured temperature and pressure, and computes average delay time based on the measured sound travel times and the computed speed of sound.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method for calibrating an ultrasonic meter, comprising:
    disposing a fluid circulating device within a flow meter;
    circulating fluid in the flow meter by operation of the fluid circulating device;
    measuring an acoustic signal transit time within the flow meter during the circulating; and
    determining, based on the measuring, a portion of the acoustic signal transit time caused by latency induced by components of the flow meter.

2. The method of claim 1, wherein the circulating is performed over time period determined to produce a uniform fluid temperature within the flow meter.

3. The method of claim 1, further comprising measuring a temperature and a pressure within the flow meter in conjunction with the measuring of the acoustic signal transit time.

4. The method of claim 1, wherein the circulating provides a fluid velocity within the flow meter of from 0.5 to 2 feet per second.

5. The method of claim 1, wherein the latency is an average of upstream and downstream acoustic signal transit times less a sound transit time between transducers.

6. The method of claim 1, further comprising:
    introducing fluid into the flow meter;
    disabling the fluid circulating device;
    measuring an acoustic signal transit time within the flow meter while the fluid circulating device is disabled; and
    determining, based on the measuring, a difference between upstream and downstream acoustic signal transit times.

7. The method of claim 1, further comprising attaching the fluid circulating device to a blind flange that closes an end of the flow meter.

8. A system for calibrating an ultrasonic meter, comprising:
    a flow meter having a sealed chamber;
    an agitator disposed within the sealed chamber and configured to move fluid within the flow meter; and
    calibration logic configured to determine a portion of a measured acoustic signal transit time caused by latency induced by the components of the flow meter;
    wherein the portion of the measured acoustic signal transit time is determined based the agitator moving fluid within the flow meter and thereby providing a uniform fluid temperature within the flow meter.

9. The system of claim 8, wherein the meter further comprises a sealing member at each end of the sealed chamber, and wherein the agitator is mounted to one of the sealing members.

10. The system of claim 8, wherein the agitator is mounted on spacers that position the agitator to allow fluid flow through the agitator.

11. The system of claim 8, further comprising a temperature sensor and a pressure sensor configured to measure respectively, a temperature and a pressure of fluid within the flow meter; wherein the calibration logic is configured to measure the temperature and pressure of the fluid in conjunction with the measuring the acoustic signal transit time.

12. The system of claim 8, wherein the calibration logic determines the latency as an average of upstream and downstream acoustic signal transit times less an acoustic signal transit time between transducers.

13. The system of claim 8, wherein the agitator is configured to move the fluid within the flow meter at a velocity between 0.5 and 2 feet per second.

14. The system of claim 8, wherein the agitator has a diameter of 10% to 35% of an internal diameter of the flow meter.

15. The system of claim 8, wherein the calibration logic is configured to:
    measure an upstream acoustic signal transit time and a downstream acoustic signal transit time within the flow meter while the agitator is disabled; and
    determine a difference between the upstream and downstream acoustic signal transit times.

16. The system of claim 8, wherein the agitator is disposed within the flow meter outside of an acoustic signal path between transducers of the flow meter.

17. Apparatus for providing a homogeneous fluid temperature in an ultrasonic flow meter, the apparatus comprising:
    a flow meter body;
    a blind flange configured to seal an end of the flow meter body; and
    an electric fan within the flow meter body to circulate fluid within the flow meter and disposed at a position outside of a signal path between ultrasonic transducers of the flow meter.

18. The apparatus of claim 17, further comprising stand-offs that separate the fan from a surface supporting the fan within the flow meter body, the stand-offs configured to allow fluid to flow through the fan.

19. The apparatus of claim 17, further comprising a magnet configured to attach the fan to the surface on the interior of the flow meter.

20. The apparatus of claim 17, wherein the fan is affixed to the blind flange.

21. The apparatus of claim 17, wherein the blind flange comprises a port through which conductors provide electrical power to the fan.

22. The apparatus of claim 17, wherein a diameter of the fan is 10% to 35% of an internal diameter of the flow meter.

23. The apparatus of claim 17, wherein the fan is configured to circulate fluid within the flow meter at a velocity between 0.5 and 2 feet per second.

* * * * *